July 1, 1969    H. LAUER    3,452,638
CLAMPING ELEMENT FOR FASTENING CLAMPING SECTIONAL SHAPES
Filed Sept. 8, 1966

INVENTOR
HERBERT LAUER
BY
ATTORNEY.

United States Patent Office 3,452,638
Patented July 1, 1969

3,452,638
CLAMPING ELEMENT FOR FASTENING
CLAMPING SECTIONAL SHAPES
Herbert Lauer, Klingenstein, near Ulm, Germany, assignor to Gesipa Gesellschaft fur Internationale Patentverwertung m.b.H., Frankfurt am Main, Germany, a corporation of Germany
Filed Sept. 8, 1966, Ser. No. 577,951
Int. Cl. F16b 13/04, 19/10
U.S. Cl. 85—77    3 Claims

ABSTRACT OF THE DISCLOSURE

A blind rivet comprising a hollow rivet including a hollow clamping section shank and a set head at one free end, a breakable mandrel positioned within the clamping section shank and having at one end a mandrel head larger than the inner surface of the clamping section shank and initially positioned adjacent the other end of the clamping section shank, the set head formed to constitute a clamping body for fastening the clamping section shank when the rivet mandrel is pulled toward the clamping body, thereby deforming the other end of the clamping section shank into a closing head which together with the clamping body clamps the clamping section shank, and the clamping body has at least one step-like shoulder at the one free end.

---

The present invention relates to a clamping element for fastening clamping members.

In light-metal construction, for instance for metal windows, display windows, chests, etc., the glass windows insulating walls or the like are supported in different types of light-metal members, These members consist as a rule of two parts; they consist of a base member, on which there is already provided a support for the windows or the like which are to be supported. On the other side, the windows are held by a so-called clamping member. The clamping member can only be inserted, when the window is in its mounted position. The clamping member is pressed onto clamp-head screws, whereby the shape of the head of the screw is accommodated to the clamping member, so that a firm clamping is obtained.

The known manner of securing the clamping members by clamp-head screws is detrimental for various reasons. A thread must be cut into the borehole, into which a clamp-head screw is to be inserted, and only then can the screw be screwed in. The clamp-head screws must be carefully screwed in, in order to prevent damage to the thread. As a rule, these clamp-head screws can be inserted only by skilled workers. This is, however, detrimental and results in a large expenditure of time, as well as increased expenses with respect to the use of thread cutting tools. However, there are also self-cutting screws which, however, have the disadvantage that they loosen during the course of time.

It is one object of the present invention, to provide a clamping element for fastening of clamping members which, can be fastened rapidly and conveniently in one operation from one side and by one worker.

It is another object of the present invention to provide a clamping element for fastening clamping members, by a known blind rivet consisting of a hollow rivet having a set head, the rivet shank end of which forms the closing head, by pulling in or through a rivet mandrel having a head, whereby the set head has, starting from its free end, at least one step-like shoulder. By this teaching, there is provided for the very first time a clamping element, which can be usefully employed, so as to meet modern requirements. The blind rivets used in this connection, provide upon fastening of the clamping sections very substantial savings in working time which have proven to be as much as 300%, since thread cutting and the screwing-in of the conventional clamp-head screws is omitted.

Furthermore, the clamping elements, designed according to the present invention, can be inserted, in a simple and convenient manner, even by unskilled workers. With these clamping elements, there is obtained the advantage, that there is no loosening of the connection, once it has been made, namely a blind-rivet connection and clamping member connection, such as occurs in the case of the conventional screws. Furthermore, no expensive investments are required for the use of these clamping elements. These clamping elements can be used without changes in design.

Depending upon the embodiment of the clamping profiles, the stepwise shoulder on the set head can be rounded. In order to clamp the clamping profile safely on the set head, the section of the set head forming the step-like shoulder can be designed frustoconically while the section of smaller diameter adjoining the shoulder is cylindrical.

Depending upon the shape of the clamping members in the clamping plane, the section of smaller diameter need not be cylindrical, but may also be of frustoconical shape.

In order to obtain a dependable clamping action in the case of clamping members of different thickness, it is suitable to make the set head together with its step-wise shoulder of correspondingly different height.

Furthermore, suitably, depending upon the opening of the clamping member, the diameters of the sections of the set head may be variable.

With these and other objects in view which will become apparent in the folowing detailed description, the present invention will be clearly understood in connection with the accompanying drawings, in which.

Figure 1:
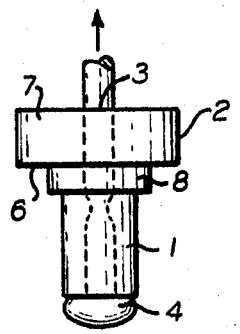
FIGURE 1 is an elevation of the standard embodiment of a clamping element, in accordance with the present invention.

Referring now to the drawings, and in particular to FIG. 1, one embodiment of the clamping element, designed in accordance with the present invention is disclosed, which comprises a rivet shank 1 having a set head 2. A rivet mandrel 3 having a rivet mandrel head 4 is inserted with a firm seat in the rivet shank 1.

Figure 6:
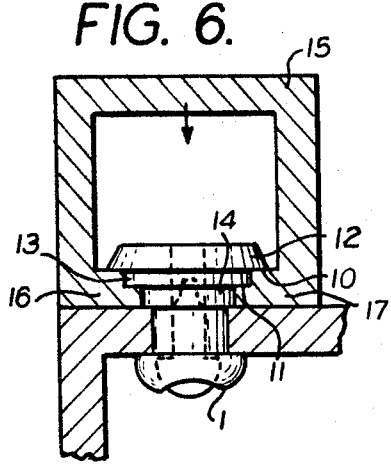
FIG. 6 is an axial section of a member to which a clamping element in accordance with the present invention has been applied, the clamping element being shown in elevation.
Figure 7:
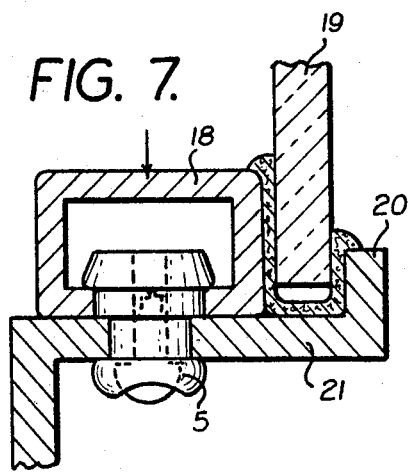
FIG. 7 is an axial section of another member to which a clamping element in accordance with the present invention has been applied, the clamping element being shown again in elevation.

The fastening of the clamping element is effected with conventional blind riveting tools such that the rivet mandrel 3 is drawn in the direction indicated by an arrow into the hollow rivet, whereby a closing head 5, as shown in FIGS. 6 and 7, is formed. After the closing head 5 has been formed the rivet mandrel 3 breaks off at a predetermined breaking point.

Figure 3:
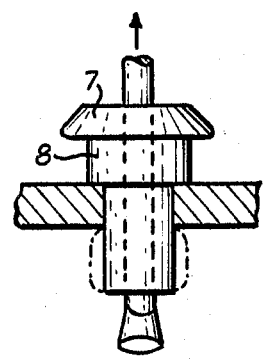
FIGS. 3, 4 and 5 are elevations of a third, a fourth and a fifth embodiment of the clamping element.

The forming of the closing head is based on the known blind rivet, in which connection other embodiments are also possible, for instance that the mandrel with its head is pulled entirely through the hollow rivet (FIG. 3).

The set head, as shown in FIG. 1, has in accordance with the present invention a step-like shoulder 6, divided into an upper section 7 and a lower section 8. The upper section 7 has a larger diameter than the lower section 8 (although not limited thereto), whereby the step-like shoulder 6 is formed. In accordance with the embodiment disclosed in FIG. 1, both the upper section 7 and the lower section 8 are of cylindrical shape. The step-like shoulder 6 includes an abutment surface parallel to and abutting one side of the base member 21 (FIG. 7) clamping, in cooperation with the closing head 5, the rivet to the base member. The step-like shoulder 6 further includes another surface, parallel to the abutment surface, axially displaced therefrom and abutting the free side of the clamping member 18 for holding the clamping member.

Figure 2:
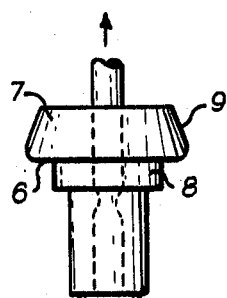
FIG. 2 is an elevation of a modified embodiment of the clamping element.

Referring now again to the drawings, and in particular to FIG. 2, the upper section 7′ is designed in the form of a conical frustum 9′, while the lower section 8′ of smaller diameter is of cylindrical shape. This embodiment favors the clamping-on of the clamping member.

In order to obtain an easy gripping of the shoulder 6′ by the clamping member, the lower edge of the upper section 7′ may be rounded off, as shown in FIG. 2.

Figure 4:
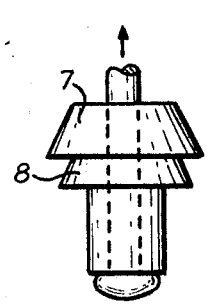

Referring now to FIG. 3, the embodiment disclosed therein has a set head, in which the upper section $7^2$ is of smaller axial thickness than the lower section $8^2$ which may, however, also be of frustoconical shape $8^3$, as indicated in FIG. 4 and the upper section $7^3$ can likewise be frustoconical. The frustoconical shape of the lower section $8^3$ of the set head, shown in FIG. 4, results in an increased clamping action.

Figure 5:
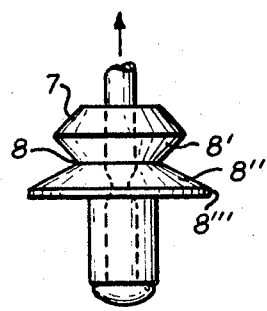

Referring now to FIG. 5, in order to be able to clamp also special members, the upper section $7^4$ may have a frustoconical shape while the lower section $8^4$ is divided into several parts. In the embodiment shown, there is provided adjoining the upper section $7^4$ an inverted frustoconically supporting part $8^a$, which in its turn is followed by a frustoconical part $8^b$, which is arranged in the same direction, as the upper section $7^4$. In order to design the lower part $8^b$ more stabile, it is followed, as shown in FIG. 5, by a cylindrical section $8^c$.

FIG. 6 discloses a set head which has two shoulders 10 and 11. The set head consists thereby of three sections 12, 13 and 14 disposed above each other, which are smaller in diameter in pyramid-like manner in the direction towards the rivet shank 1. On the set head formed in this manner, there is pressed, in the direction indicated by an arrow, a U-shaped clamping member 15, whereby the two clamping flanges 16 and 17 are designed complementary to the sections 13 and 14, so that the clamping member is secured by the shoulders 10 and 11. It is self-evident, that the clamping element must be riveted, as shown, before it is applied.

Referring now to FIG. 7, a clamping element is disclosed, in its riveted state, as shown in FIG. 2, a correspondingly designed clamping member 18 is also clamped on after the riveting. It can be ascertained also from FIG. 7, that the clamping member 18 serves as abutment for a plate, for instance a pane of glass 19, the opposite bearing of which is formed by an L-shaped extension 20 on the basic member 21.

The present invention is not limited to the embodiments shown in the drawings. It rather comprises also other types of set heads, and blind rivets different than those shown. For instance, the set head with its step-like shoulders can also be made hollow "angularly joining" herein means at angles to all surfaces.

While I have disclosed several embodiments of the present invention, it is to be understood that these embodiments are given by example only and not in a limiting sense.

I claim:
1. A blind rivet for attaching a base member and a clamping member, comprising
   a hollow rivet including a hollow clamping section shank having a set head at one free end,
   a breakable rivet mandrel positioned within said clamping section shank and having at one end a mandrel head larger than the inner surface of said clamping section shank, said mandrel head initially positioned adjacent the other end of said clamping section shank,
   said set head formed to constitute a clamping body for fastening said clamping section shank when said rivet mandrel is pulled toward said clamping body, thereby deforming said other end of said clamping section shank into a closing head which together with said clamping body clamps said clamping section shank, and
   said clamping body has at least one step-like shoulder at said one free end, comprising
   an abutment surface parallel to and abutting clampingly one side of said base member and a second surface directionally facing said base member and parallel to said abutment surface and axially displaced therefrom,
   said abutment surface and said second surface having outer peripheries of different diameters,
   a connecting surface angularly joining said abutment surface to said second surface, said connecting surface is of frustoconical shape having the small diameter thereof adjacent said second surface, and
   said abutment surface said second surface and said connecting surface together forming a contour for fastening said clamping member.

2. A blind rivet for attaching a base member and a clamping member, comprising
   a hollow rivet including a hollow clamping section shank having a set head at one free end,
   a breakable rivet mandrel positioned within said clamping section shank and having at one end a mandrel head larger than the inner surface of said clamping section shank, said mandrel head initially positioned adjacent the other end of said clamping section shank,
   said set head formed to constitute a clamping body for fastening said clamping section shank when said rivet mandrel is pulled toward said clamping body, thereby deforming said other end of said clamping section shank into a closing head which together with said clamping body clamps said clamping section shank, and
   said clamping body has at least one step-like shoulder at said one free end, comprising
   an abutment surface parallel to and abutting clampingly one side of said base member and a second surface directionally facing said base member and inclined relative to said abutment surface and axially disposed therefrom,
   said abutment surface and said second surface having outer peripheries of different diameters,
   a frustoconical connecting surface angularly joining said abutment surface to said second surface, said surface is frustoconical and together said second surface and said connecting surface from an inwardly directed V-shape, and
   said abutment surface, said second surface and said connecting surface together forming a contour for fastening said clamping member.

3. A blind rivet for attaching a base member and a clamping member, comprising a hollow rivet including a hollow clamping section shank having a set head at one free end, a breakable rivet mandrel positioned within said clamping section shank and having at one end a mandrel head larger than the inner surface of said clamping section shank, said mandrel head initially positioned adjacent the other end of said clamping section shank, said set head formed to constitute a clamping body for fastening said clamping section shank when said rivet mandrel is pulled toward said clamping body, thereby deforming said other end of said clamping section shank into a closing head which together with said clamping body clamps said clamping section shank, and said clamping body has at least one step-like shoulder at said one free end, comprising an abutment surface parallel to and abutting clampingly one side of said base member and a second surface directionally facing said base member and parallel to said abutment surface and axially displaced therefrom, said abutment surface and said second surface having outer peripheries of different diameters, a connecting surface angularly joining said abutment surface to said second surface, said connecting surface includes, a third surface parallel to said abutment surface and said second surface, and disposed therebetween, a fourth surface connecting said second second surface to said third surface, and a fifth surface connecting said abutment surface to said third surface, and, said abutment surface, said second surface and said connecting surface together forming a contour for fastening said clamping member.

References Cited

UNITED STATES PATENTS

| | | |
|---|---|---|
| 2,984,877 | 5/1961 | Perrochat. |
| 3,031,049 | 4/1962 | Somville _____ 52—498 |
| 3,138,225 | 6/1964 | Jansson. |
| 3,149,530 | 6/1964 | Kolec _____ 85—77 |
| 3,220,062 | 11/1965 | Hermann _____ 52—502 |
| 3,232,161 | 2/1966 | Fernberg _____ 85—72 |
| 3,286,580 | 11/1966 | Jeal _____ 85—77 |

EDWARD C. ALLEN, *Primary Examiner.*

U.S. Cl. X.R.

85—37